United States Patent
Fang et al.

(10) Patent No.: US 12,435,179 B2
(45) Date of Patent: Oct. 7, 2025

(54) ENVIRONMENT-FRIENDLY VINYL ESTER RESIN

(71) Applicant: Guangdong Meiheng New Material Technology Co., Ltd., Qingyuan (CN)

(72) Inventors: Heng Fang, Qingyuan (CN); Jie Wei, Qingyuan (CN); Minsi He, Qingyuan (CN)

(73) Assignee: Guangdong Meihang New Material Technology Co., Ltd., Qingyuan (CN)

( * ) Notice: Subject to any disclaimer, the term of this patent is extended or adjusted under 35 U.S.C. 154(b) by 477 days.

(21) Appl. No.: 18/150,923

(22) Filed: Jan. 6, 2023

(65) Prior Publication Data

US 2023/0220151 A1   Jul. 13, 2023

Related U.S. Application Data

(63) Continuation of application No. PCT/CN2022/085330, filed on Apr. 6, 2022.

(30) Foreign Application Priority Data

Jan. 12, 2022  (CN) .................. 202210032218.X

(51) Int. Cl.
C08G 59/24   (2006.01)
C08J 3/24    (2006.01)

(52) U.S. Cl.
CPC .............. C08G 59/245 (2013.01); C08J 3/24 (2013.01); *C08J 2363/02* (2013.01)

(58) Field of Classification Search
CPC .................... C08G 59/245; C08G 59/2492
See application file for complete search history.

(56) References Cited

U.S. PATENT DOCUMENTS

| | | | |
|---|---|---|---|
| 5,024,785 A | 6/1991 | Hefner, Jr. et al. | |
| 8,722,770 B2 * | 5/2014 | Jansen ................ | C08K 5/098 |
| | | | 524/604 |

FOREIGN PATENT DOCUMENTS

| | | |
|---|---|---|
| CN | 1746180 A | 3/2006 |
| CN | 1793196 A | 6/2006 |
| CN | 101525408 A | 9/2009 |
| CN | 102361933 A | 2/2012 |
| CN | 102604000 A | 7/2012 |
| CN | 103910855 A | 7/2014 |
| CN | 104072687 A | 10/2014 |
| CN | 104725575 A * | 6/2015 |
| CN | 104910352 A | 9/2015 |
| CN | 107868229 A | 4/2018 |
| CN | 107880741 A | 4/2018 |
| CN | 108314775 A | 7/2018 |
| CN | 109535349 A | 3/2019 |

(Continued)

OTHER PUBLICATIONS

CN-104725575-A_ Jun. 24, 2015 _English Translation.*

(Continued)

*Primary Examiner* — Michael L Leonard
(74) *Attorney, Agent, or Firm* — Cooper Legal Group, LLC

(57) ABSTRACT

Disclosed is an environment-friendly vinyl ester resin, which is prepared by mixing following raw materials in percentage by weight: 20-65 weight percentage (wt %) of epoxy resin, 5-35 wt % of methyl monomer, 8-25 wt % of unsaturated acid, 0.01-0.3 wt % of a catalyst, 0.01-0.08 wt % of polymerization inhibitor and 10-40 wt % of a cross-linking agent.

7 Claims, 1 Drawing Sheet

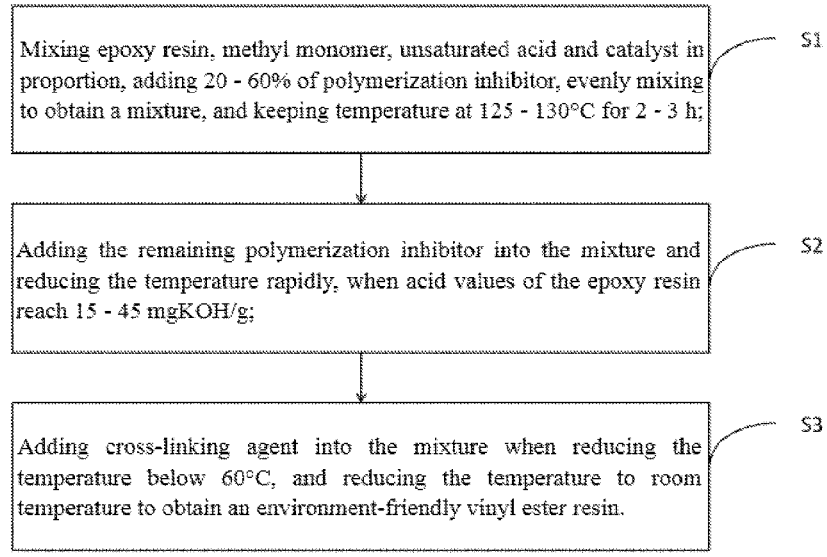

(56) References Cited

FOREIGN PATENT DOCUMENTS

| | | | | |
|---|---|---|---|---|
| CN | 110054757 A | 7/2019 | | |
| CN | 111072872 A | 4/2020 | | |
| CN | 114249879 A | 3/2022 | | |
| JP | H11140160 A | 5/1999 | | |
| JP | 2004035703 A | 2/2004 | | |
| WO | 2007132724 A1 | 11/2007 | | |
| WO | WO-2008003494 A1 * | 1/2008 | ............. | C08L 33/04 |
| WO | WO-2012050777 A1 * | 4/2012 | ........... | C08G 63/672 |
| WO | WO-2013019705 A1 * | 2/2013 | ........ | C08G 59/1461 |

OTHER PUBLICATIONS

Liu, "Study on Synthesis on Corrosion Resistant Vinyl Ester Resin", Sichuan Chemical Industry and Corrosion Control, 1999.

Ma et al., "Study of bisphenol a epoxy vinyl ester resin modified with fumaric acid" Tianjin Chemical Industry, vol. 35, No. 4, Jul. 2021.

Qiu, et et al. "Synthesis and Performance of Novel Fluorine-Containing Epoxy Vinyl Ester Resin", Journal of Functional Polymers, vol. 24, No. 3, Sep. 2011.

* cited by examiner

```
┌─────────────────────────────────────────────────────────────┐
│ Mixing epoxy resin, methyl monomer, unsaturated acid and catalyst in │ ── S1
│ proportion, adding 20 - 60% of polymerization inhibitor, evenly mixing │
│ to obtain a mixture, and keeping temperature at 125 - 130°C for 2 - 3 h; │
└─────────────────────────────────────────────────────────────┘
                              │
                              ▼
┌─────────────────────────────────────────────────────────────┐
│ Adding the remaining polymerization inhibitor into the mixture and │ ── S2
│ reducing the temperature rapidly, when acid values of the epoxy resin │
│ reach 15 - 45 mgKOH/g; │
└─────────────────────────────────────────────────────────────┘
                              │
                              ▼
┌─────────────────────────────────────────────────────────────┐
│ Adding cross-linking agent into the mixture when reducing the │ ── S3
│ temperature below 60°C, and reducing the temperature to room │
│ temperature to obtain an environment-friendly vinyl ester resin. │
└─────────────────────────────────────────────────────────────┘
```

ENVIRONMENT-FRIENDLY VINYL ESTER RESIN

CROSS-REFERENCE TO RELATED APPLICATIONS

This application is a continuation of PCT/CN 2022/085330, filed on Apr. 6, 2022 and claims priority of Chinese Patent Application No. 202210032218.X, filed on Jan. 12, 2022, the entire contents of which are incorporated herein by reference.

TECHNICAL FIELD

The present application generally relates to polymer materials, and in particular to an environment-friendly vinyl ester resin.

BACKGROUND

Vinyl ester resin is a resin with unsaturated double bonds at molecular end groups or side groups synthesized from epoxy resin and unsaturated acid as main raw materials. The vinyl ester resin has reliable mechanical properties of the epoxy resin as well as excellent molding properties of unsaturated polyester resin, thus has a very broad market in a field of corrosion-resistant glass fiber reinforce plastic (FRP) products and is widely used in petroleum, chemical industry, paper making, metallurgy, thermal power, medicine, food, transportation, environmental protection, construction and other industries.

At present, most commercially available vinyl ester resins use the styrene as a diluent, but the styrene volatilizes quickly, pollutes environment and harms health of operators. Therefore, it is urgent to provide an environment-friendly vinyl ester resin with excellent chemical properties.

SUMMARY

An objective of the present application is to provide an environment-friendly vinyl ester resin with excellent chemical properties.

To achieve the above objective, the present application adopts following technical schemas.

An environment-friendly vinyl ester resin is prepared by mixing following raw materials in percentage by weight: 20-65 weight percentage (wt %) of epoxy resin, 5-35 wt % of methyl monomer, 8-25 wt % of unsaturated acid, 0.01-0.3 wt % of a catalyst, 0.01-0.08 wt % of polymerization inhibitor and 10-40 wt % of a cross-linking agent.

Further, the methyl monomer is one or more of methacrylic acid and a derivative of the methacrylic acid, where the derivative of the methacrylic acid is any one of methyl methacrylate, ethyl methacrylate, butyl methacrylate, monoethylene glycol methacrylate, beta-hydroxypropyl methacrylate, glycidyl methacrylate and allyl methacrylate.

Further, the catalyst is prepared by mixing following raw materials in percentage by weight: 5-20 wt % of cobalt chloride, 10-30 wt % of sodium hydroxide, 20-60 wt % of acetylacetone and 10-40 wt % of water.

Further, a preparation method of the catalyst includes compounding the above raw materials in proportion, evenly stirring and mixing to obtain the catalyst. Commercially available catalysts have unstable performance and low conversion efficiency, which leads to precipitation and incomplete reaction. In the present application, the catalyst obtained by mixing the above raw materials has stable performance and may overcome above-mentioned prior technical problems.

Further, the cross-linking agent is prepared by compounding tetrapolypropylene, n-butyl ester, methyl ester, butyl methacrylate and 2-Hydroxyethyl acrylate.

Further, the cross-linking agent is prepared by mixing following raw materials in percentage by weight: 8-25 wt % of the tetrapolypropylene, 5-20 wt % of the n-butyl ester, 5-20 wt % of the methyl ester, 3-15 wt % of the butyl methacrylate and 20-37 wt % of the 2-Hydroxyethyl acrylate.

Further, the unsaturated acid is acrylic acid, fumaric acid, p-Phthalic acid or butenoic acid.

Further, the polymerization inhibitor is one or more of tert-butyl hydroquinone, tert-butyl catechol, p-benzoquinone, methyl hydroquinone and hydroquinone.

Further, the epoxy resin is epoxy resin 128 or phenolic epoxy resin.

A preparation method of the environment-friendly vinyl ester resin includes:

S1, mixing the epoxy resin, the methyl monomer, the unsaturated acid and the catalyst in proportion, adding 20-60 percent (%) of the polymerization inhibitor, evenly mixing to obtain a mixture, and keeping temperature at 125-130 degree Celsius (° C.) for 2-3 hours (h);

S2, adding the remaining polymerization inhibitor into the mixture and reducing the temperature rapidly when acid values of the epoxy resin reach 15-45 mgKOH/g; and S3, adding the cross-linking agent into the mixture when reducing the temperature below 60° C., and reducing the temperature to room temperature to obtain the environment-friendly vinyl ester resin.

Further, the preparation method of the environment-friendly vinyl ester resin has no special requirements on speeds of reducing the temperature, and an objective of rapidly reducing the temperature is to shorten production time and improve production efficiency.

The present application has following effects.

By using a certain proportion of the epoxy resin, the methyl monomer, the unsaturated acid, the catalyst, the polymerization inhibitor and the cross-linking agent as raw materials, the present application not only has no styrene emission, but also is environment-friendly. Moreover, the vinyl ester resin obtained in the present application has high cross-linking density, high strength and high impact resistance, and thus may be widely used in fields of pipeline forming, pipeline repair, spray construction, high corrosion resistance engineering and the like.

BRIEF DESCRIPTION OF THE DRAWINGS

FIG. 1 shows a flow diagram for a preparation method of an environment-friendly vinyl ester resin in an embodiment of the application.

DETAILED DESCRIPTION OF THE EMBODIMENTS

The technical schemes of the present application are clearly and completely described below with reference to embodiments. Any technical modifications made according to the technical schemes of the present application, without departing from the scope protected by the objective and claims of the present application, shall fall within the scope of protection of the present application.

Embodiment 1

An environment-friendly vinyl ester resin is prepared by mixing following raw materials in percentage by weight: 40 wt % of epoxy resin 128 (epoxy resin), 20 wt % of methacrylic acid (methyl monomer), 20 wt % of fumaric acid (unsaturated acid), 0.01 wt % of a catalyst, 0.08 wt % of tert-butyl hydroquinone (polymerization inhibitor) and 19.91 wt % of a cross-linking agent.

The catalyst is prepared by mixing the following raw materials in percentage by weight: 10 wt % of cobalt chloride, 15 wt % of sodium hydroxide, 45 wt % of acetylacetone and 30 wt % of water.

The cross-linking agent is prepared by mixing the following raw materials in percentage by weight: 15 wt % of tetrapolypropylene, 15 wt % of n-butyl ester, 20 wt % of methyl ester, 15 wt % of butyl methacrylate and 35 wt % of 2-Hydroxyethyl acrylate.

As shown in FIG. 1, a preparation method of the environment-friendly vinyl ester resin includes:
- S1, mixing the epoxy resin 128, the methacrylic acid, the fumaric acid and the catalyst in proportion, adding 20% of the tert-butyl hydroquinone, evenly mixing to obtain a mixture, and keeping temperature at 130° C. for 2 h;
- S2, adding remaining 80% of the tert-butyl hydroquinone into the mixture and reducing the temperature rapidly, when acid values of the epoxy resin 128 reach 15 mgKOH/g; and
- S3, adding the cross-linking agent into the mixture when reducing the temperature below 60° C., and reducing the temperature to room temperature to obtain the environment-friendly vinyl ester resin.

Embodiment 2

An environment-friendly vinyl ester resin is prepared by mixing the following raw materials in percentage by weight: 30 wt % of the epoxy resin 128, 34.93 wt % of the methacrylic acid, 25 wt % of p-Phthalic acid (the unsaturated acid), 0.04 wt % of the catalyst, 0.03 wt % of p-benzoquinone (the polymerization inhibitor) and 10 wt % of the cross-linking agent.

The catalyst is prepared by mixing the following raw materials in percentage by weight: 10 wt % of the cobalt chloride, 15 wt % of the sodium hydroxide, 45 wt % of the acetylacetone and 30 wt % of the water.

The cross-linking agent is prepared by mixing the following raw materials in percentage by weight: 15 wt % of the tetrapolypropylene, 15 wt % of the n-butyl ester, 20 wt % of the methyl ester, 15 wt % of the butyl methacrylate and 35 wt % of the 2-Hydroxyethyl acrylate.

A preparation method of the environment-friendly vinyl ester resin includes:
- S1, mixing the epoxy resin 128, the methacrylic acid, the p-Phthalic acid and the catalyst in proportion, adding 20% of the p-benzoquinone, evenly mixing to obtain a mixture, and keeping the temperature at 125° C. for 3 h;
- S2, adding remaining 80% of the p-benzoquinone into the mixture and reducing the temperature rapidly, when the acid values of the epoxy resin 128 reach 15 mgKOH/g; and
- S3, adding the cross-linking agent into the mixture when reducing the temperature below 60° C., and reducing the temperature to the room temperature to obtain the environment-friendly vinyl ester resin.

Embodiment 3

An environment-friendly vinyl ester resin is prepared by mixing the following raw materials in percentage by weight: 20 wt % of the epoxy resin 128, 27 wt % of the methacrylic acid, 13.12 wt % of acrylic acid (the unsaturated acid), 0.3 wt % of the catalyst, 0.08 wt % of hydroquinone (the polymerization inhibitor) and 39.5 wt % of the cross-linking agent.

The catalyst is prepared by mixing the following raw materials in percentage by weight: 10 wt % of the cobalt chloride, 15 wt % of the sodium hydroxide, 45 wt % of the acetylacetone and 30 wt % of the water.

The cross-linking agent is prepared by mixing the following raw materials in percentage by weight: 15 wt % of the tetrapolypropylene, 15 wt % of the n-butyl ester, 20 wt % of the methyl ester, 15 wt % of the butyl methacrylate and 35 wt % of the 2-Hydroxyethyl acrylate.

A preparation method of the environment-friendly vinyl ester resin includes:
- S1, mixing the epoxy resin 128, the methacrylic acid, the acrylic acid and the catalyst in proportion, adding 20% of the hydroquinone, evenly mixing to obtain a mixture, and keeping the temperature at 125° C. for 3 h;
- S2, adding remaining 80% of the hydroquinone into the mixture and reducing the temperature rapidly, when the acid values of the epoxy resin 128 reach 15 mgKOH/g; and
- S3, adding the cross-linking agent into the mixture when reducing the temperature below 60° C., and reducing the temperature to the room temperature to obtain the environment-friendly vinyl ester resin.

Embodiment 4

An environment-friendly vinyl ester resin is prepared by mixing the following raw materials in percentage by weight: 65 wt % of the epoxy resin 128, 5 wt % of the methacrylic acid, 8 wt % of butenoic acid (the unsaturated acid), 0.1 wt % of the catalyst, 0.01 wt % of methyl hydroquinone (the polymerization inhibitor) and 21.89 wt % of the cross-linking agent.

The catalyst is prepared by mixing the following raw materials in percentage by weight: 10 wt % of the cobalt chloride, 15 wt % of the sodium hydroxide, 45 wt % of the acetylacetone and 30 wt % of the water.

The cross-linking agent is prepared by mixing the following raw materials in percentage by weight: 15 wt % of the tetrapolypropylene, 15 wt % of the n-butyl ester, 20 wt % of the methyl ester, 15 wt % of the butyl methacrylate and 35 wt % of the 2-Hydroxyethyl acrylate.

A preparation method of the environment-friendly vinyl ester resin includes:
- S1, mixing the epoxy resin 128, the methacrylic acid, the butenoic acid and the catalyst in proportion, adding 20% of the methyl hydroquinone, evenly mixing to obtain a mixture, and keeping the temperature at 130° C. for 2 h;
- S2, adding remaining 80% of the methyl hydroquinone into the mixture and reducing the temperature rapidly, when the acid values of the epoxy resin 128 reach 15 mgKOH/g; and
- S3, adding the cross-linking agent into the mixture when reducing the temperature below 60° C., and reducing the temperature to the room temperature to obtain the environment-friendly vinyl ester resin.

Embodiment 5

An environment-friendly vinyl ester resin is prepared by mixing the following raw materials in percentage by weight: 40 wt % of the epoxy resin 128, 20 wt % of the methacrylic acid, 20 wt % of the fumaric acid, 0.01 wt % of the catalyst, 0.08 wt % of the hydroquinone and 19.91 wt % of the cross-linking agent.

The catalyst is prepared by mixing the following raw materials in percentage by weight: 5 wt % of the cobalt chloride, 30 wt % of the sodium hydroxide, 25 wt % of the acetylacetone and 40 wt % of the water.

The cross-linking agent is prepared by mixing the following raw materials in percentage by weight: 15 wt % of the tetrapolypropylene, 15 wt % of the n-butyl ester, 20 wt % of the methyl ester, 15 wt % of the butyl methacrylate and 35 wt % of the 2-Hydroxyethyl acrylate.

A preparation method of the environment-friendly vinyl ester resin includes:
- S1, mixing the epoxy resin 128, the methacrylic acid, the fumaric acid and the catalyst in proportion, adding 20% of the hydroquinone, evenly mixing to obtain a mixture, and keeping the temperature at 125° C. for 3 h;
- S2, adding remaining 80% of the hydroquinone into the mixture and reducing the temperature rapidly, when the acid values of the epoxy resin 128 reach 35 mgKOH/g; and
- S3, adding the cross-linking agent into the mixture when reducing the temperature below 60° C., and reducing the temperature to the room temperature to obtain the environment-friendly vinyl ester resin.

Embodiment 6

An environment-friendly vinyl ester resin is prepared by mixing the following raw materials in percentage by weight: 40 wt % of the epoxy resin 128, 20 wt % of the methacrylic acid, 20 wt % of the fumaric acid, 0.01 wt % of the catalyst, 0.08 wt % of the tert-butyl hydroquinone and 19.91 wt % of the cross-linking agent.

The catalyst is prepared by mixing the following raw materials in percentage by weight: 20 wt % of the cobalt chloride, 10 wt % of the sodium hydroxide, 60 wt % of the acetylacetone and 10 wt % of the water.

The cross-linking agent is prepared by mixing the following raw materials in percentage by weight: 25 wt % of the tetrapolypropylene, 20 wt % of the n-butyl ester, 20 wt % of the methyl ester, 15 wt % of the butyl methacrylate and 20 wt % of the 2-Hydroxyethyl acrylate.

A preparation method of the environment-friendly vinyl ester resin includes:
- S1, mixing the epoxy resin 128, the methacrylic acid, the fumaric acid and the catalyst in proportion, adding 20% of the tert-butyl hydroquinone, evenly mixing to obtain the mixture, and keeping the temperature at 125° C. for 3 h;
- S2, adding remaining 80% of the tert-butyl hydroquinone into the mixture and reducing the temperature rapidly, when the acid values of the epoxy resin 128 reach 15 mgKOH/g; and
- S3, adding the cross-linking agent into the mixture when reducing the temperature below 60° C., and reducing the temperature to the room temperature to obtain the environment-friendly vinyl ester resin.

Embodiment 7

An environment-friendly vinyl ester resin is prepared by mixing the following raw materials in percentage by weight: 40 wt % of the epoxy resin 128, 20 wt % of the methacrylic acid, 20 wt % of the fumaric acid, 0.01 wt % of the catalyst, 0.08 wt % of the tert-butyl hydroquinone and 19.91 wt % of the cross-linking agent.

The catalyst is prepared by mixing the following raw materials in percentage by weight: 20 wt % of the cobalt chloride, 10 wt % of the sodium hydroxide, 60 wt % of the acetylacetone and 10 wt % of the water.

The cross-linking agent is prepared by mixing the following raw materials in percentage by weight: 18 wt % of the tetrapolypropylene, 15 wt % of the n-butyl ester, 20 wt % of the methyl ester, 10 wt % of the butyl methacrylate and 37 wt % of the 2-Hydroxyethyl acrylate.

A preparation method of the environment-friendly vinyl ester resin includes:
- S1, mixing the epoxy resin 128, the methacrylic acid, the fumaric acid and the catalyst in proportion, adding 20% of the tert-butyl hydroquinone, evenly mixing to obtain the mixture, and keeping the temperature at 125° C. for 3 h;
- S2, adding remaining 80% of the tert-butyl hydroquinone into the mixture and reducing the temperature rapidly, when the acid values of the epoxy resin 128 reach 15 mgKOH/g; and
- S3, adding the cross-linking agent into the mixture when reducing the temperature below 60° C., and reducing the temperature to the room temperature to obtain the environment-friendly vinyl ester resin.

Embodiment 8

An environment-friendly vinyl ester resin is prepared by mixing the following raw materials in percentage by weight: 40 wt % of the epoxy resin 128, 20 wt % of the methacrylic acid, 20 wt % of the fumaric acid, 0.01 wt % of the catalyst, 0.08 wt % of the tert-butyl hydroquinone and 19.91 wt % of the cross-linking agent.

The catalyst is prepared by mixing the following raw materials in percentage by weight: 10 wt % of the cobalt chloride, 15 wt % of the sodium hydroxide, 45 wt % of the acetylacetone and 30 wt % of the water.

The cross-linking agent is prepared by mixing the following raw materials in percentage by weight: 15 wt % of the tetrapolypropylene, 15 wt % of the n-butyl ester, 20 wt % of the methyl ester, 15 wt % of the butyl methacrylate and 35 wt % of the 2-Hydroxyethyl acrylate.

A preparation method of the environment-friendly vinyl ester resin includes:
- S1, mixing the epoxy resin 128, the methacrylic acid, the fumaric acid and the catalyst in the proportion, adding 60% of the tert-butyl hydroquinone, evenly mixing to obtain a mixture, and keeping the temperature at 130° C. for 2 h;
- S2, adding remaining 40% of the tert-butyl hydroquinone into the mixture and reducing the temperature rapidly, when the acid values of the epoxy resin 128 reach 15 mgKOH/g; and
- S3, adding the cross-linking agent into the mixture when reducing the temperature below 60° C., and reducing the temperature to the room temperature to obtain the environment-friendly vinyl ester resin.

Embodiment 9

An environment-friendly vinyl ester resin is prepared by mixing following raw materials in percentage by weight: 40 wt % of phenolic epoxy resin (the epoxy resin), 20 wt % of the methacrylic acid, 20 wt % of the fumaric acid, 0.01 wt % of the catalyst, 0.08 wt % of the tert-butyl hydroquinone and 19.91 wt % of the cross-linking agent.

The catalyst is prepared by mixing the following raw materials in percentage by weight: 10 wt % of the cobalt chloride, 15 wt % of the sodium hydroxide, 45 wt % of the acetylacetone and 30 wt % of the water.

The cross-linking agent is prepared by mixing the following raw materials in percentage by weight: 15 wt % of the tetrapolypropylene, 15 wt % of the n-butyl ester, 20 wt % of the methyl ester, 15 wt % of the butyl methacrylate and 35 wt % of the 2-Hydroxyethyl acrylate.

A preparation method of the environment-friendly vinyl ester resin includes:

S1, mixing the phenolic epoxy resin, the methacrylic acid, the fumaric acid and the catalyst in proportion, adding 20% of the tert-butyl hydroquinone, evenly mixing to obtain a mixture, and keeping the temperature at 130° C. for 2 h;

S2, adding remaining 80% of the tert-butyl hydroquinone into the mixture and reducing the temperature rapidly, when the acid values of the epoxy resin 128 reach 15 mgKOH/g; and S3, adding the cross-linking agent into the mixture when reducing the temperature below 60° C., and reducing the temperature to the room temperature to obtain the environment-friendly vinyl ester resin.

Comparative Embodiment 1

An environment-friendly vinyl ester resin is prepared by mixing following raw materials in percentage by weight: 40 wt % of the epoxy resin 128, 20 wt % of the methacrylic acid, 20 wt % of the fumaric acid, 0.01 wt % of aluminium chloride (the catalyst), 0.08 wt % of the tert-butyl hydroquinone and 19.91 wt % of the cross-linking agent.

The cross-linking agent is prepared by mixing the following raw materials in percentage by weight: 15 wt % of the tetrapolypropylene, 15 wt % of the n-butyl ester, 20 wt % of the methyl ester, 15 wt % of the butyl methacrylate and 35 wt % of the 2-Hydroxyethyl acrylate.

A preparation method of the environment-friendly vinyl ester resin includes:

S1, mixing the epoxy resin 128, the methacrylic acid, the fumaric acid and the aluminium chloride in proportion, adding 20% of the tert-butyl hydroquinone, evenly mixing to obtain a mixture, and keeping the temperature at 130° C. for 2 h;

S2, adding remaining 80% of the tert-butyl hydroquinone into the mixture and reducing the temperature rapidly, when the acid values of the epoxy resin 128 reach 15 mgKOH/g; and S3, adding the cross-linking agent into the mixture when reducing the temperature below 60° C., and reducing the temperature to the room temperature to obtain the environment-friendly vinyl ester resin.

The vinyl ester resins prepared in the above Embodiments and the Comparative embodiment 1 are tested, and test results are shown in Table 1.

TABLE 1

| | Test method | Embodiment 1 | Embodiment 2 | Embodiment 3 | Embodiment 4 | Embodiment 5 | Embodiment 6 | Embodiment 7 | Embodiment 8 | Embodiment 9 | Comparative embodiment 1 |
|---|---|---|---|---|---|---|---|---|---|---|---|
| Acid values (mgKOH/g) | GB/T 2895 | 8 | 6 | 9 | 10 | 8 | 7 | 8 | 8 | 8 | 7 |
| Viscosity ((23° C.) mPa·s) | GB/T 22314 | 415 | 361 | 359 | 382 | 397 | 409 | 416 | 420 | 415 | 450 |
| Appearance | Visual inspection | Light yellow | Light yellow | Light yellow | Light yellow | Light yellow | Light yellow | Light yellow | Light yellow | Light yellow | Light yellow |
| Gel time ((25° C.) min) | GB/T 7193 | 17 | 12 | 18 | 15 | 12 | 17 | 17 | 18 | 17 | 25 |
| Tensile strength (MPa) | GB/T 2567 | 67 | 71 | 72 | 68 | 71 | 70 | 69 | 69 | 56 | 53 |
| Tensile modulus (GPa) | GB/T 2567 | 3841 | 3811 | 3820 | 3851 | 3713 | 3725 | 3880 | 3796 | 3587 | 3334 |
| Elongation at break (%) | GB/T 2567 | 5.2 | 5.4 | 4.9 | 5.0 | 5.4 | 5.1 | 4.9 | 4.8 | 3.5 | 3.1 |
| Bending strength (MPa) | GB/T 2567 | 135 | 132 | 129 | 130 | 137 | 137 | 135 | 138 | 117 | 109 |
| Bending modulus (GPa) | GB/T 2567 | 3621 | 3707 | 3526 | 3612 | 3688 | 3662 | 3612 | 3701 | 3175 | 3057 |
| Barcol hardness | GB/T 3854 | 51 | 51 | 49 | 50 | 48 | 50 | 49 | 48 | 45 | 40 |

As may be seen from the Table 1, the vinyl ester resins prepared in the Embodiments 1-9 have the elongation at break of 3.5-5.4%, the bending strength of 117-138 megapascal (MPa) and the gel time of 12-18 minutes (min), so they have the better properties than properties of the vinyl ester resin prepared in the Comparative embodiment 1. By using a certain proportion of the epoxy resin, the methyl monomer, the unsaturated acid, the catalyst, the polymerization inhibitor and the cross-linking agent as raw materials, the present application not only has no styrene emission, but also is environment-friendly. Moreover, the vinyl ester resin obtained in the present application has high cross-linking density, high strength and high impact resistance, and thus may be widely used in fields of pipeline forming, pipeline repair, spray construction, high corrosion resistance engineering and the like.

It should be understood that the technical schemes of the present application are not limited to the limits of the above specific embodiments, and any technical variations made according to the technical schemes of the present application, without departing from the scope protected by the objective and claims of the present application, fall within the scope of protection of the present application.

What is claimed is:

1. An environment-friendly vinyl ester resin prepared by mixing following raw materials in percentage by weight: 20-65 weight percentage (wt %) of epoxy resin, 5-35 wt % of methyl monomer, 8-25 wt % of unsaturated acid, 0.01-0.3 wt % of a catalyst, 0.01-0.08 wt % of polymerization inhibitor and 10-40 wt % of a cross-linking agent; wherein the catalyst is prepared by mixing following raw materials in percentage by weight: 5-20 wt % of cobalt chloride, 10-30 wt % of sodium hydroxide, 20-60 wt % of acetylacetone and 10-40 wt % of water.

2. The environment-friendly vinyl ester resin according to claim 1, wherein the cross-linking agent is prepared by compounding tetrapolypropylene, n-butyl ester, methyl ester, butyl methacrylate and 2-Hydroxyethyl acrylate.

3. The environment-friendly vinyl ester resin according to claim 2, wherein the cross-linking agent is prepared by mixing following raw materials in percentage by weight: 8-25 wt % of the tetrapolypropylene, 5-20 wt % of the n-butyl ester, 5-20 wt % of the methyl ester, 3-15 wt % of the butyl methacrylate and 20-37 wt % of the 2-Hydroxyethyl acrylate.

4. The environment-friendly vinyl ester resin according to claim 1, wherein the unsaturated acid is one of acrylic acid, fumaric acid, p-Phthalic acid or butenoic acid.

5. The environment-friendly vinyl ester resin according to claim 1, wherein the polymerization inhibitor is one or more of tert-butyl hydroquinone, tert-butyl catechol, p-benzoquinone, methyl hydroquinone or hydroquinone.

6. The environment-friendly vinyl ester resin according to claim 1, wherein the epoxy resin is epoxy resin 128 or phenolic epoxy resin.

7. The environment-friendly vinyl ester resin according to claim 1, wherein the methyl monomer is one or more of methacrylic acid or a derivative of the methacrylic acid.

* * * * *